United States Patent [19]

Derner et al.

[11] 4,154,491
[45] May 15, 1979

[54] RETAINER RING FOR CYLINDRICAL ROLLER BEARINGS

[75] Inventors: William J. Derner; James R. Elliott, both of Indianapolis, Ind.

[73] Assignee: FMC Corporation, San Jose, Calif.

[21] Appl. No.: 787,686

[22] Filed: Apr. 14, 1977

[51] Int. Cl.² ............................................. F16C 33/46
[52] U.S. Cl. ................................ 308/217; 308/207 R
[58] Field of Search ............... 308/217, 218, 212, 213, 308/201, 235, 207 R; 29/148.4 A, 148.4 C

[56] References Cited

U.S. PATENT DOCUMENTS

| | | | |
|---|---|---|---|
| 1,223,952 | 4/1917 | Friend | 308/217 |
| 1,346,147 | 7/1920 | Webster | 308/217 |
| 1,473,168 | 11/1923 | Wingquist | 308/218 |
| 3,306,687 | 2/1967 | Smith | 308/213 |
| 3,582,164 | 6/1971 | Derner et al. | 308/201 |
| 3,647,273 | 3/1972 | Pfaffenberger | 308/217 |
| 3,733,110 | 5/1973 | Davis | 308/217 |
| 3,827,771 | 8/1974 | Fernlund | 308/212 |

FOREIGN PATENT DOCUMENTS 133005  10/1919  United Kingdom ............. 308/217

*Primary Examiner*—Charles E. Frankfort
*Attorney, Agent, or Firm*—J. W. Edwards; J. F. Verhoeven

[57] ABSTRACT

A bearing assembly retainer ring has pockets for holding cylindrical rollers in arcuately spaced relationship about a central axis of the retainer ring. Each pocket has two end faces that are spaced axially of the retainer ring and two side faces that are spaced laterally of the axial spacing between the two end faces. The pocket extends radially through inner and outer peripheral edges of the retainer ring to receive a roller therein having a diameter which is greater than the radial span of the pocket end faces so that the roller extends beyond the inner and outer peripheral edges of the retainer ring. The axial spacing between the pocket end faces is slightly greater than the axial length of the roller to provide restricted clearances between the ends of the roller and the end faces of the pocket when the roller is centered within the pocket. Chamfers are provided on the end faces of the pockets at the inner and outer peripheral edges thereof. These chamfers enable the roller to pivot within the pocket from a position wherein the roller is aligned axially between the pocket end faces to a cocked position wherein both end faces of the pocket contact the roller and/or the side faces of the pocket contact the roller to resist further pivotal movement.

6 Claims, 6 Drawing Figures

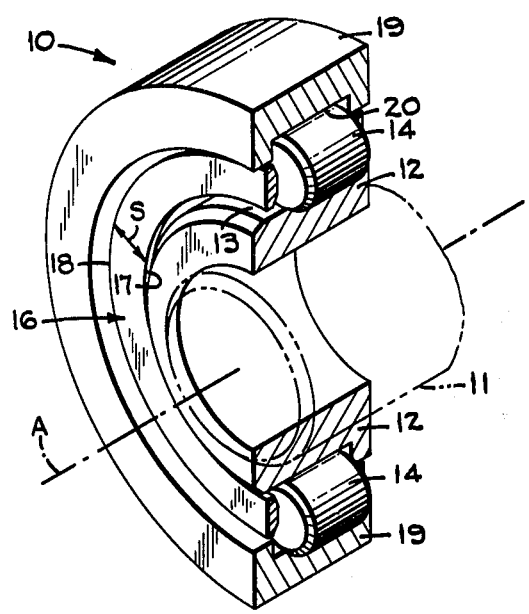
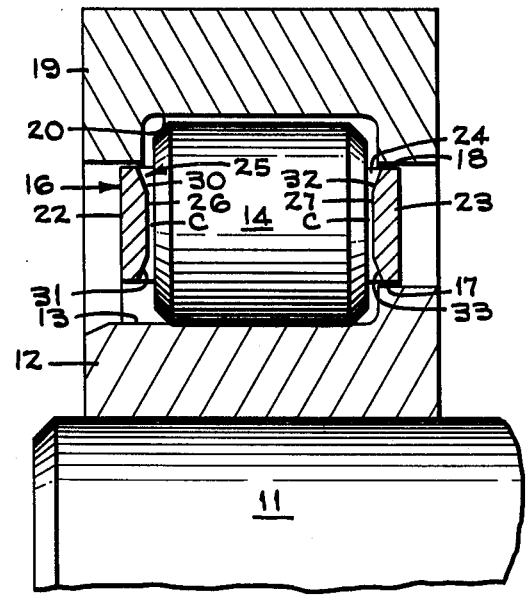
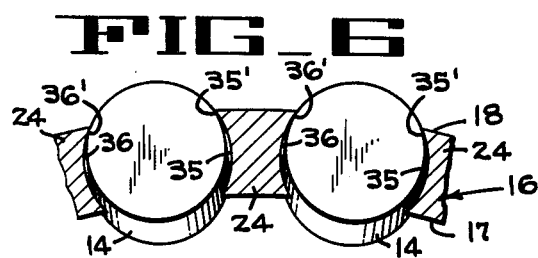
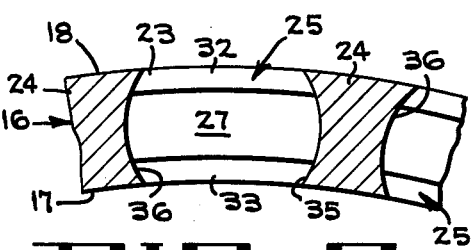
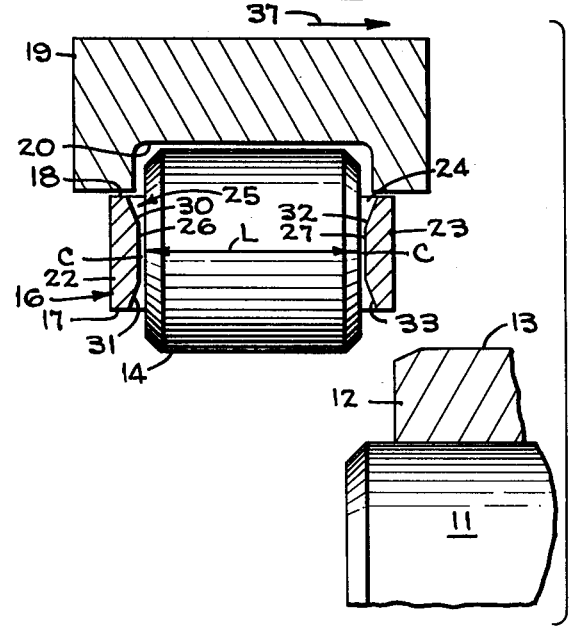
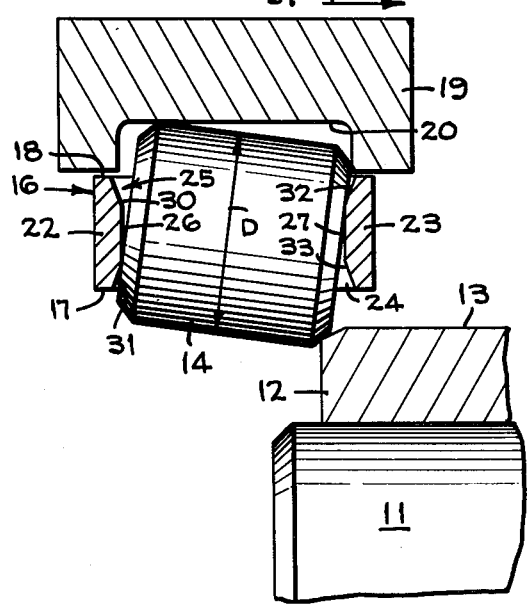

RETAINER RING FOR CYLINDRICAL ROLLER BEARINGS

BACKGROUND OF THE INVENTION

1. Field of the Invention

This invention relates to a cage or retainer ring for holding cylindrical rollers of a bearing assembly. More specifically, the invention pertains to such a retainer ring wherein chamfers are provided on inner and outer peripheral edges of the pocket end faces.

2. Description of the Prior Art

When a cylindrical roller bearing assembly, such as shown in U.S. Pat. No. 3,647,273, is mounted upon a shaft, an inner race ring is first locked upon the shaft. Then, a retainer ring is slipped about the shaft and the inner race ring. Sometimes cylindrical rollers that project diametrically beyond pocket end faces of the retainer ring strike the inner race ring, as the retainer ring and the rollers are being slipped about the inner race ring. When the clearance is restricted in an axial direction between ends of the rollers and the ends of the pocket, the entire force from striking the inner race ring is transmitted through the cylindrical roller to the opposite end of the pocket. This often results in a deformation of the retainer ring, a loosening of retainer ring joints, or a breaking of the retainer ring.

SUMMARY OF THE INVENTION

To reduce the impact force upon an end face of a retainer ring pocket, each pocket end face has chamfers along inner and outer peripheral edges thereof. These chamfers enable a roller to pivot within the pocket from a position wherein the roller is aligned axially between the pocket end faces to a cocked position wherein both end faces of the pocket contact the roller and/or the side faces of the pocket contact the roller to resist further pivotal movement.

The present invention pertains to a bearing assembly retainer ring that has pockets for holding cylindrical rollers in arcuately spaced relationship about a central axis of the retainer ring. Each pocket has two faces that are spaced axially of the retainer ring and two side faces that are spaced laterally of the axial spacing between the two end faces. The pocket extends radially through inner and outer peripheral edges of the retainer ring to receive a roller therein. The roller has a diameter which is greater than the radial span of the pocket end faces between the inner and outer peripheral edges thereof. Thus, the roller extends diametrically beyond the end face edges of the retainer ring pocket. The axial spacing between the pocket end faces is slightly greater than the axial length of the roller to provide restricted clearances between the ends of the roller and the end faces of the pocket when the roller is centered within the pocket. Chamfers are provided on the end faces of the pockets at the inner and outer peripheral edges thereof. These chamfers enable the roller to pivot within the pocket from a position wherein the roller is aligned axially between the pocket end faces to a cocked position wherein both end faces of the pocket contact the roller and/or the side faces of the pocket contact the roller to resist further pivotal movement.

BRIEF DESCRIPTION OF THE DRAWINGS

FIG. 1 is a perspective view of a cylindrical roller bearing assembly that is mounted upon a shaft with portions of the assembly being broken away to show a retainer embodying the present invention.

FIG. 2 is an enlarged partial transverse section in elevation of the bearing assembly shown in FIG. 1.

FIG. 3 is a partial arcuate section of the retainer ring illustrating the pocket ends.

FIG. 4 is an operational view illustrating a retainer ring with a cylindrical roller that is about to be fitted upon an inner race.

FIG. 5 is an operational view illustrating the cocked position of the cylindrical roller after the roller has struck the inner race.

FIG. 6 is a partial arcuate section of the retainer ring with a pair of rollers in cocked positions within pockets illustrating contact between the rollers and the side faces of the pockets.

DESCRIPTION OF THE PREFERRED EMBODIMENT

With reference to FIG. 1, a cylindrical roller bearing assembly 10 is mounted about a shaft 11. This assembly has an inner ring 12 with an outer surface which defines an inner race 13. Cylindrical rollers 14 contact the inner race. These rollers are held by a retainer ring 16 in arcuately spaced relationship about a central axis A of the retainer ring. This central axis coincides with the axis of the shaft when the retainer ring is mounted about the shaft. The retainer ring has a radial span S between an inner peripheral edge 17 and an outer peripheral edge 18 of the retainer ring. An outer ring 19 has an inner surface which defines an outer race 20 that provides outer bearing support about the cylindrical rollers.

Looking now at FIG. 2, the retainer ring 16 is formed by two end rings 22 and 23 that are separated by transverse spacer bars 24. A pocket 25 is defined between the pair of end rings and each pair of spacer bars. The end rings define pocket end faces 26 and 27 that are spaced axially of the retainer ring by a distance slightly greater than the roller axial length L (FIG. 4) of the roller 14. Thus, restricted clearances C are provided between the ends of the roller and the pocket end faces when the roller is centered within the pocket. These restricted clearances limit relative axial float between the retainer ring and the roller. The pockets extend radially through the inner peripheral edge 17 and the outer peripheral edge 18 of the retainer ring to receive a roller therein. The radial span S (FIG. 1) of the retainer ring is less than the roller diameter D (FIG. 5) so that the roller extends beyond the inner and outer peripheral edges of the retainer ring to contact the bearing surfaces of the inner race 13 or the outer race 20.

On the pocket end face 26, a chamfer 30 is provided along the outer peripheral edge 18 and a chamfer 31 is provided along the inner peripheral edge 17. On the pocket end face 27, a chamfer 32 is provided along the outer peripheral edge and a chamfer 33 is provided along the inner peripheral edge. These chamfers enable the roller 14 to pivot within the pocket 25 from a position wherein the roller is aligned axially between the pocket end faces, as shown in FIGS. 2 and 4, to a cocked position, as shown in FIG. 5, wherein both end faces of the pocket contact the roller and/or the side faces of the pocket contact the roller to resist further pivotal movement. The chamfers on opposite pocket end faces that are diagonally opposed, such as chamfers 30 and 33, and chamfers 31 and 32, preferably extend in substantially parallel planes that are spaced apart by the roller length L. Located between the chamfers 30 and 31 on the end face 26 is a central zone. A corresponding central zone is located between the chamfers 32 and 33 on the end face 27. These central zones of the end faces define the axial length of the pocket and provide surfaces for maintaining the relative axial location of the retainer ring 16 and the roller 14.

FIG. 3 shows an arcuate portion of the end ring 23 illustrating the chamfers 32 and 33 in elevation. The spacer bars 24 are also shown having concave side surfaces 35 and 36 that are oppositely disposed. The curvature of these concave side surfaces is shaped to loosely hold a cylindrical roller 14 therein. Should the roller pivot within the pocket to a cocked position, as shown in FIG. 6, the concave side surface 35 and 36 contact the roller near the corners 35' and 36' at adjacent ends of the spacer bars, and similar contact is made with the roller by the side surfaces at the opposite ends of the spacer bars near corners at the inner peripheral edge 17.

Referring now to FIGS. 4 and 5, the installation of the roller bearing assembly 10 about the shaft 11 and the operation of the improved retainer ring 16 will now be described. The inner ring 12 is mounted upon the shaft 11 and locked thereto for rotation therewith. The retainer ring 16 is filled with cylindrical rollers 14 by inserting the rollers radially outward from the inner peripheral edge 17 of the retainer ring into the pockets 25 wherein the rollers are loosely retained in place by the concave side surfaces 35 and 36 of the spacer bars 24. The outer ring 19 is positioned about the retainer ring before the rollers are inserted. After insertion of the rollers the retainer ring and the outer ring are moved together in the direction of an arrow 37 so as to slip about the inner ring.

In the event that the retainer ring 16 is not properly aligned coaxially with the inner ring 12, as the retainer ring is moved towards the inner ring, a cylindrical roller 14 will strike the inner ring. The roller pivots from an axially aligned position within the pocket 25, as shown in FIG. 4, to the cocked position shown in FIG. 5. In this position the force applied to the roller is resisted by the end ring 22 along the chamfer 31 and by the end ring 23 along the chamfer 32. Resistance is also provided by the side surfaces 35 and 36 of the spacer bar 24 near the corners 35' and 36', as shown in FIG. 6. Similar resistance is also provided by the side surfaces at the opposite ends of the spacer bars near corners thereof at the inner peripheral edge 17. Thus, both end rings and the side surfaces of the spacer bars resist the force of impact due to the roller striking the inner ring. The stress induced by the force within each end ring and within the spacer bars is less than the stress that would be developed in one end ring that had to resist the entire force alone.

Retainer rings have milled or drilled pockets, having segmented structural design, or having molded construction all must accommodate assembly forces incurred at bearing installation. Such forces can deform or fracture the end rings, loosen retainer joints, or break the retainer. The present invention reduces such forces upon an individual end face of a retainer ring by allowing a cylindrical roller to pivot within a retainer pocket to a cocked position wherein both end faces and/or the side faces of the pocket contact the roller to resist further the force.

Although the best mode contemplated for carrying out the present invention has been herein shown and described, it will be apparent that modification and variation may be made without departing from what is regarded to be the subject matter of the invention.

What is claimed is:

1. In a bearing assembly having an outer ring with a cylindrical inner surface that defines an outer race, a separable inner ring with a cylindrical outer surface that defines an inner race, a plurality of cylindrical rollers having cylindrical surfaces for contacting the inner and outer races, and a retainer ring having a plurality of pockets for holding cylindrical rollers in arcuately spaced relationship about a central axis of the retainer ring, said retainer ring defining each pocket by two end faces that are spaced axially of the retainer ring and two side faces that are spaced arcuately about the central axis of the retainer ring, said retainer ring having an inner peripheral edge and an outer peripheral edge with the pockets extending radially through the retainer ring between the peripheral edges, the radial distance between the inner and outer peripheral edges being less than the diameter of the cylindrical rollers so that the rollers project radially beyond the peripheral edges of the retainer ring, said pocket end faces having flat planar surfaces confronting the flat ends of a cylindrical roller and being spaced apart by a distance slightly greater than the axial length of the roller to provide restricted clearances between the roller ends and the pocket end faces when the roller is centered within the pocket, said flat planar surfaces extending radially of the retainer ring, the improvement comprising chamfers on the retainer ring between said flat planar surfaces and the inner and outer pocket edges enabling the cylindrical rollers to pivot within the pockets, each roller being pivotable from a position where the roller is aligned axially within the pocket to a cocked position where the roller is supported at a plurality of points against further pivotal movement by contact with a retainer pocket end face and at least one additional surface as a consequence of said retainer ring being subjected to an assembly impact force that occurs when the inner ring strikes a roller upon insertion of the inner ring into the outer ring, said retainer ring having strength to withstand the assembly impact force only when such force is distributed by the roller to a plurality of support surfaces.

2. The improved bearing assembly described in claim 1 wherein each pair of pocket side faces defined by the retainer ring have opposed concave surfaces with a curvature for loosely retaining the roller therein.

3. The improved bearing assembly described in claim 2 wherein the concave surface curvature of each pocket side face enables the side faces at diagonally opposed positions adjacent the inner and outer peripheral edges of the ring to contact the roller when in a cocked position and support the roller against further pivotal movement.

4. The improved bearing assembly described in claim 3 wherein each pair of pocket end faces are spaced axially of the retainer ring by a distance that enables both end faces to contact the roller when in a cocked position and support the roller against further pivotal movement.

5. The improved bearing assembly described in claim 1 wherein each pair of pocket end faces are spaced axially of the retainer ring by a distance that enables both end faces to contact the roller when in a cocked position and support the roller against further pivotal movement.

6. In a bearing having an outer race ring, a separable inner race ring, a plurality of cylindrical rollers having cylindrical surfaces for contacting the inner and outer race rings, and a retainer ring having a plurality of pockets for holding the cylindrical rollers in arcuately spaced relationship about a central axis of the retainer ring, said retainer having a pair of axially spaced end rings that form end faces of the pockets, a plurality of spacer bars secured between the end rings and spaced at arcuately equal spaces about the central axis, each adjacent pair of spacer bars having opposed concave surfaces that form side faces of the pocket with a curvature for loosely retaining a cylindrical roller within the pocket, said pocket extending radially through the retainer ring between inner and outer peripheral edges thereof, the radial distance between the inner and outer peripheral edges being less than the diameter of the cylindrical roller so that the rollers project radially beyond the peripheral edges of the retainer ring, said retainer end rings having flat planar surfaces extending radially of the retainer ring that form the pocket end faces to confront the flat ends of a cylindrical roller, said pocket end faces being spaced apart by a distance slightly greater than the axial length of the roller to provide restricted clearances between the roller ends and the pocket end faces when the roller is centered within the pocket, the improvement comprising chamfers on the retainer end rings between said flat planar surfaces and the inner and outer peripheral edges enabling the cylindrical rollers to pivot within the pockets, each roller being pivotable from a position where the roller is aligned axially within the pocket to a cocked position where the roller is supported at a plurality of points against further pivotal movement by contact with a retainer pocket end face and at least one additional surface as a consequence of said retainer ring being subjected to an assembly impact force that occurs when the inner race ring strikes a roller upon insertion of the inner race ring into the outer race ring, said retainer ring having strength to withstand the assembly impact force only when such force is distributed by the roller to a plurality of support surfaces.

* * * * *